US010123340B2

(12) United States Patent
Seo et al.

(10) Patent No.: US 10,123,340 B2
(45) Date of Patent: Nov. 6, 2018

(54) METHOD FOR PERFORMING MEASUREMENT IN WIRELESS COMMUNICATION SYSTEM AND APPARATUS THEREFOR

(71) Applicant: LG ELECTRONICS INC., Seoul (KR)

(72) Inventors: Inkwon Seo, Seoul (KR); Hyukjin Chae, Seoul (KR); Seungmin Lee, Seoul (KR); Kijun Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 176 days.

(21) Appl. No.: 14/892,162

(22) PCT Filed: May 26, 2014

(86) PCT No.: PCT/KR2014/004664
§ 371 (c)(1),
(2) Date: Nov. 18, 2015

(87) PCT Pub. No.: WO2014/189338
PCT Pub. Date: Nov. 27, 2014

(65) Prior Publication Data
US 2016/0095131 A1 Mar. 31, 2016

Related U.S. Application Data

(60) Provisional application No. 61/827,019, filed on May 24, 2013, provisional application No. 61/980,566, filed on Apr. 17, 2014.

(51) Int. Cl.
*H04W 72/08* (2009.01)
*H04W 72/04* (2009.01)
(Continued)

(52) U.S. Cl.
CPC ....... *H04W 72/085* (2013.01); *H04W 72/042* (2013.01); *H04W 72/0413* (2013.01);
(Continued)

(58) Field of Classification Search
CPC ........ H04W 4/06; H04W 8/005; H04W 4/005
See application file for complete search history.

(56) References Cited

U.S. PATENT DOCUMENTS

2012/0014334 A1* 1/2012 Oh ..................... H04W 76/023
370/329
2012/0243431 A1 9/2012 Chen et al.
(Continued)

FOREIGN PATENT DOCUMENTS

| KR | 10-2012-0006900 A | 1/2012 |
| WO | WO 2012/159270 A1 | 11/2012 |
| WO | WO 2013/028044 A2 | 2/2013 |

*Primary Examiner* — Kashif Siddiqui
(74) *Attorney, Agent, or Firm* — Birch, Stewart, Kolasch & Birch, LLP

(57) ABSTRACT

One embodiment of the present invention comprises a method for a terminal performing a measurement in a wireless communication system. The method for performing a measurement comprises the steps of: a terminal performing a measurement in a particular resource area and transmitting the measurement result to a base station; and receiving information regarding a first signal from the base station, wherein if the terminal is configured to select the resource to be used for transmitting the first signal, the information regarding the first signal includes a resource pool that is determined on the basis of the measurement result.

12 Claims, 9 Drawing Sheets

(51) Int. Cl.
- *H04L 5/00* (2006.01)
- *H04W 72/00* (2009.01)
- *H04W 72/02* (2009.01)
- *H04W 76/14* (2018.01)

(52) U.S. Cl.
CPC .......... *H04L 5/0007* (2013.01); *H04L 5/0044* (2013.01); *H04W 72/00* (2013.01); *H04W 72/02* (2013.01); *H04W 76/14* (2018.02)

(56) References Cited

U.S. PATENT DOCUMENTS

| | | | | |
|---|---|---|---|---|
| 2012/0300662 A1* | 11/2012 | Wang | ............... | H04W 72/02 370/252 |
| 2013/0059583 A1 | 3/2013 | Van Phan et al. | | |
| 2013/0109301 A1* | 5/2013 | Hakola | ............... | H04W 76/023 455/39 |
| 2014/0094183 A1* | 4/2014 | Gao | ............... | H04W 72/048 455/450 |
| 2014/0211696 A1* | 7/2014 | Chai | ............... | H04W 76/023 370/328 |
| 2014/0241260 A1* | 8/2014 | Schmidt | ............... | H04W 76/023 370/329 |
| 2014/0301228 A1* | 10/2014 | Kwak | ............... | H04W 8/005 370/252 |
| 2014/0335875 A1* | 11/2014 | Li | ............... | H04W 76/023 455/450 |
| 2015/0382365 A1* | 12/2015 | Li | ............... | H04L 5/0085 370/329 |
| 2016/0050698 A1* | 2/2016 | Siomina | ............... | H04W 8/005 370/329 |
| 2016/0057604 A1* | 2/2016 | Luo | ............... | H04W 8/005 370/330 |
| 2016/0100355 A1* | 4/2016 | Chen | ............... | H04W 8/005 370/232 |
| 2016/0142898 A1* | 5/2016 | Poitau | ............... | H04W 72/0413 370/329 |

* cited by examiner

FIG. 5
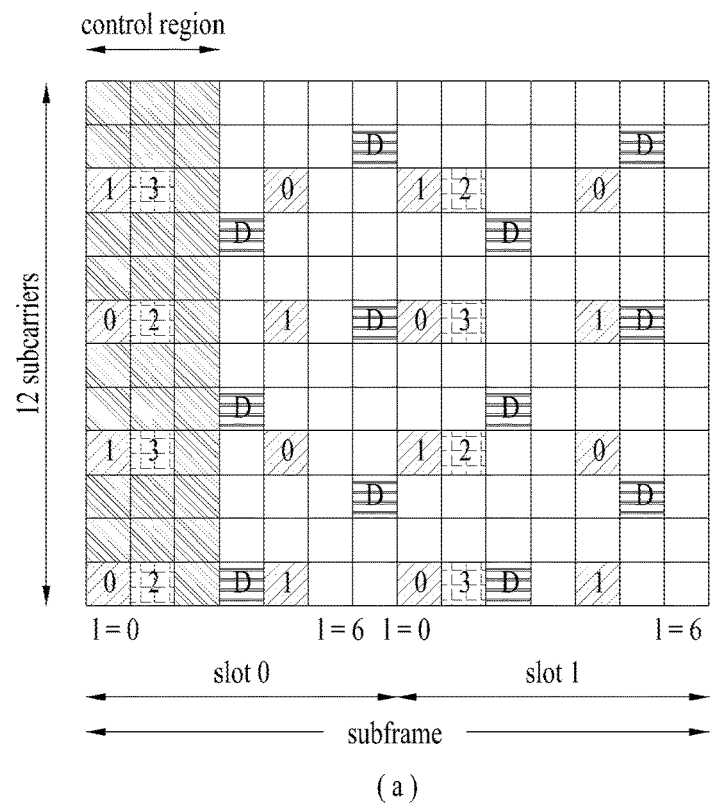
(a)
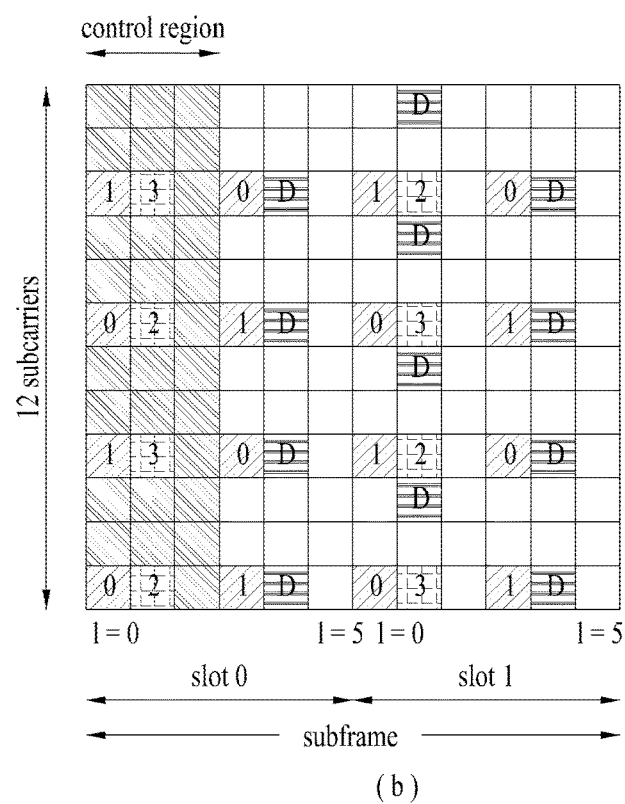
(b)

FIG. 6
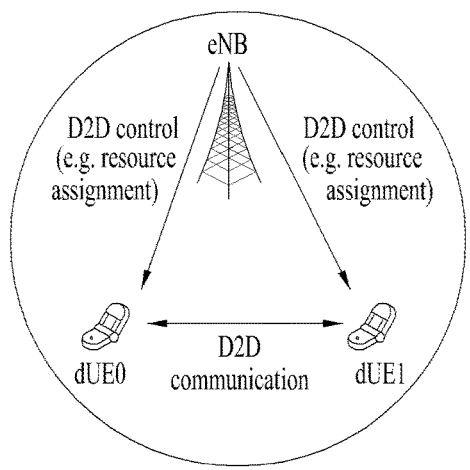
(a) Network-assisted D2D
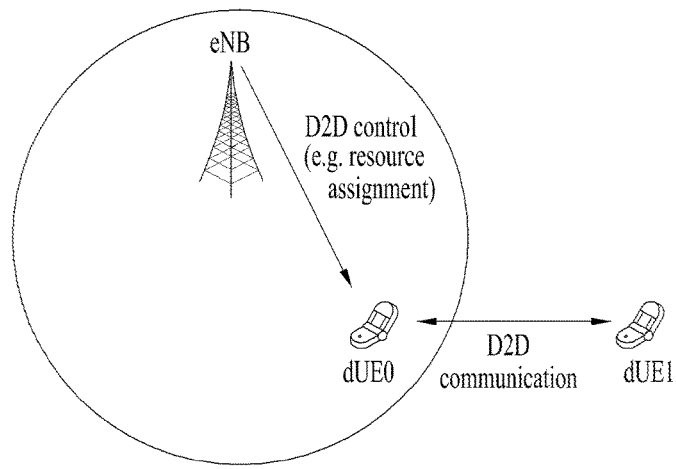
(b) Network-assisted D2D
(Partial network)
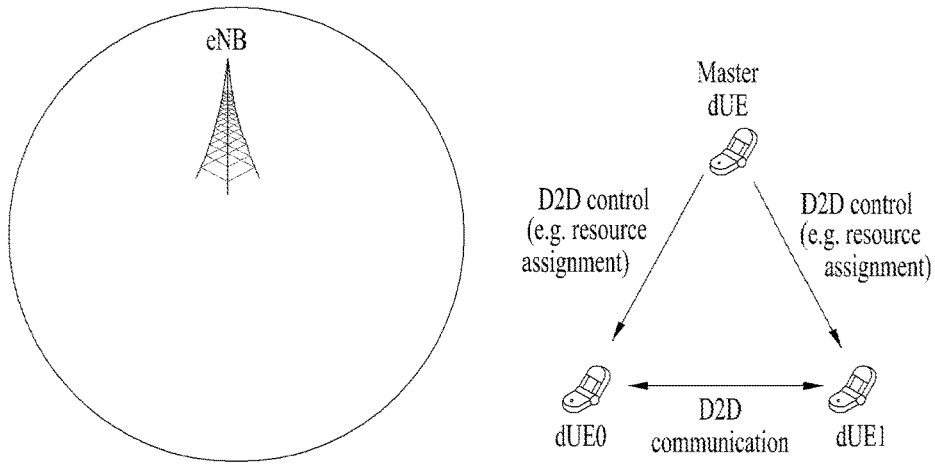
(c) Master UE-assisted D2D
(out of corverage)

METHOD FOR PERFORMING MEASUREMENT IN WIRELESS COMMUNICATION SYSTEM AND APPARATUS THEREFOR

CROSS REFERENCE TO RELATED APPLICATIONS

This application is the National Phase of PCT International Application No. PCT/KR2014/004664, filed on May 26, 2014, which claims priority under 35 U.S.C. 119(e) to U.S. Provisional Application No. 61/827,019, filed on May 24, 2013 and 61/980,566, filed on Apr. 17, 2014, all of which are hereby expressly incorporated by reference into the present application.

TECHNICAL FIELD

Following description relates to a wireless communication system, and more particularly, to a method of performing measurement and an apparatus therefor.

BACKGROUND ART

Wireless communication systems have been widely deployed to provide various types of communication services such as voice or data services. Generally, a wireless communication system is a multiple access system capable of supporting communication with multiple users by sharing available system resources (bandwidth, transmit power, etc.). Multiple access systems include, for example, a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, a multi carrier frequency division multiple access (MC-FDMA) system, etc.

DISCLOSURE OF THE INVENTION

Technical Task

A technical task of the present invention to provide various matters related to a measurement in a device-to-device communication.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to a first technical aspect of the present invention, a method of performing a measurement by a user equipment in a wireless communication system including: performing the measurement in a prescribed resource area and transmitting a result of the measurement to a base station and receiving information on a first signal from the base station. In this case, if the user equipment is configured to select a resource for transmitting the first signal, the information on the first signal includes a resource pool and the resource pool is determined based on the result of the measurement.

To further achieve these and other advantages and in accordance with the purpose of the present invention, according to a second technical aspect of the present invention, a user equipment device performing a measurement in a wireless communication system includes a reception module and a processor, the processor configured to perform the measurement in a prescribed resource area, transmit a result of the measurement to a base station, and receive information on a first signal from the base station. In this case, if the user equipment is configured to select a resource for transmitting the first signal, the information on the first signal includes a resource pool and the resource pool is determined based on the result of the measurement.

The first technical aspect and the second technical aspect can include all or a part of following items.

If the base station is configured to allocate the resource for transmitting the first signal, the information on the first signal includes the resource for transmitting the first signal and the resource for transmitting the first signal can be determined-based on the result of the measurement.

The user equipment can determine the resource for transmitting the first signal in the resource pool.

If the base station is configured to allocate the resource for transmitting the first signal, a first measurement granularity for performing a measurement in the prescribed resource area can be different from a second measurement granularity for performing a measurement in the prescribed resource area when the user equipment is configured to allocate the resource for transmitting the first signal.

The first measurement granularity corresponds to a subset, the second measurement granularity corresponds to a resource pool and the resource pool can consist of a plurality of subsets.

The prescribed resource area can include a plurality of resource patterns for transmission (RPTs).

The result of the measurement may correspond to information indicating n (n is a positive integer) number of RPTs of which a measurement value is smallest among measurement results measured on each of a plurality of the RPTs.

The information indicating the n number of RPTs of which the measurement value is smallest may correspond to n number of RPT indexes.

The information indicating the n number of RPTs of which the measurement value is smallest may correspond to a bitmap of a size of total numbers of RPTs.

A resource corresponding to the prescribed resource area may correspond to an available resource in which a signal related to device-to-device communication is transmittable.

An Orthogonal Frequency Division Milltiplexing (OFDM) symbol related to automatic gain control (AGC) can be excluded from the available resource.

The first signal may correspond to one of a discovery signal, a communication signal, a synchronization signal and a scheduling assignment signal.

Advantageous Effects

According to the present invention, a user equipment can perform a measurement appropriate for a device-to-device communication and transmit/receive a signal related to the device-to-device communication in a resource to which a measurement result is reflected, thereby enhancing efficiency.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram to describe a reference signal;

FIG. 6 is a diagram for an example of network environment to which the present invention is applicable;

BEST MODE

Mode for Invention

Figure 1:
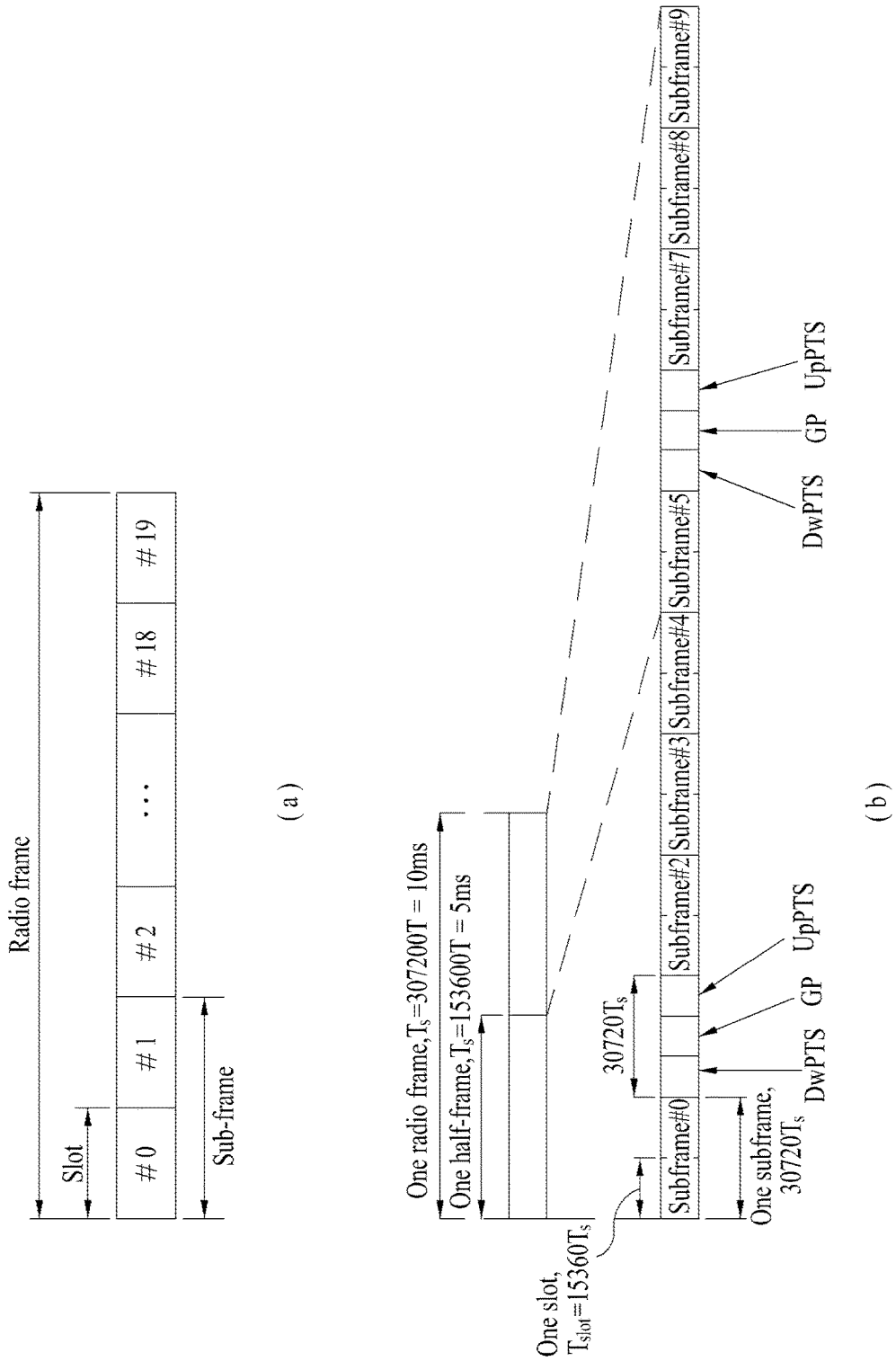
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (UTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(*a*) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
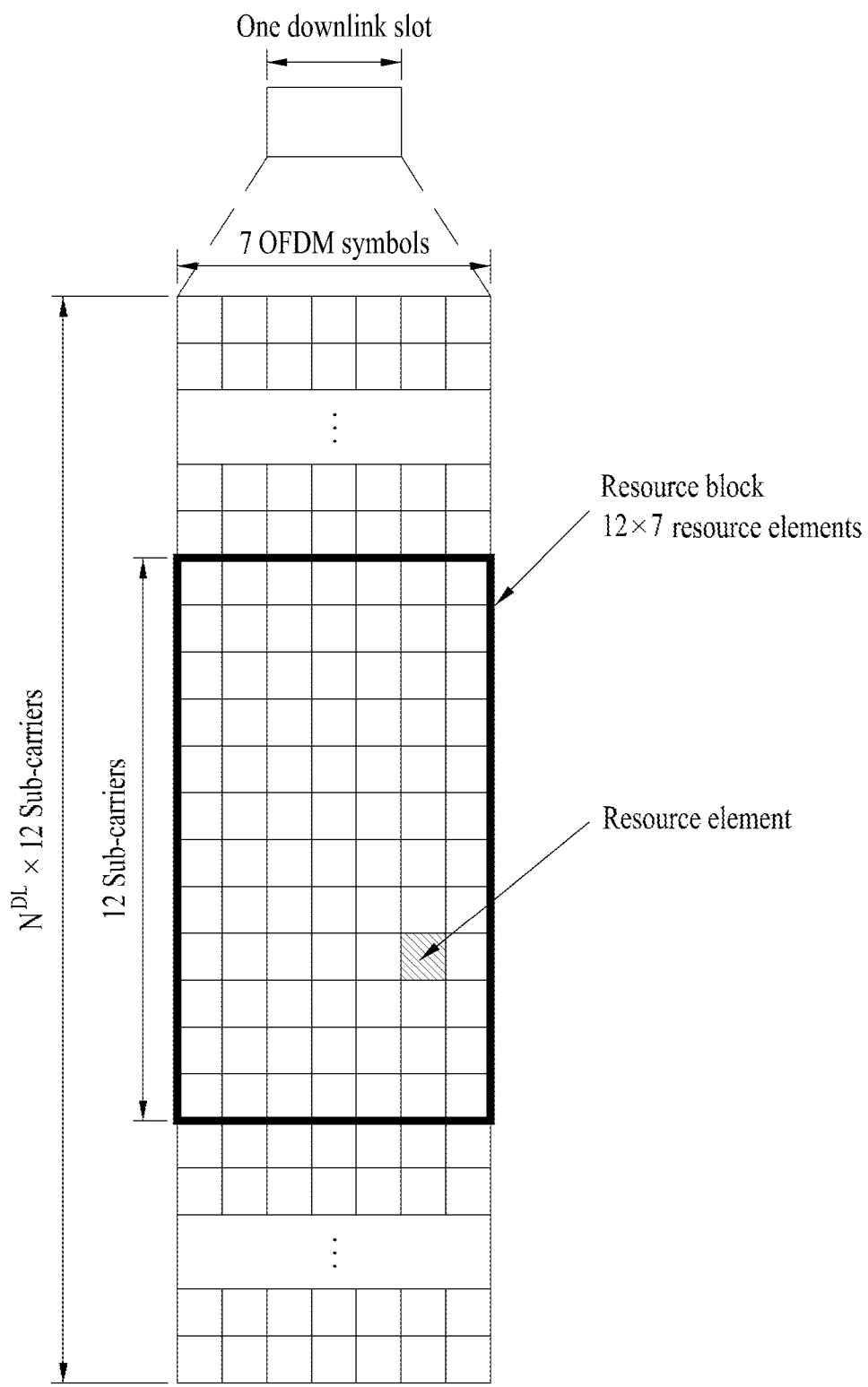
FIG. 2 is a diagram of a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CR Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
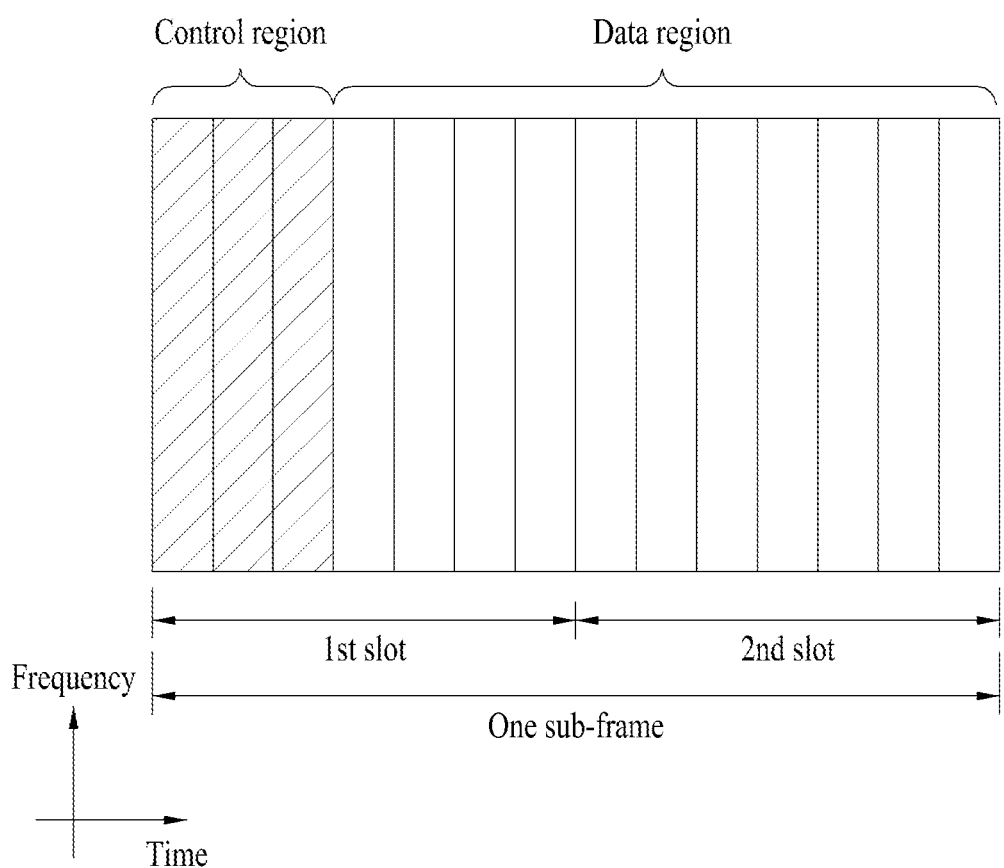
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LIE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL=SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
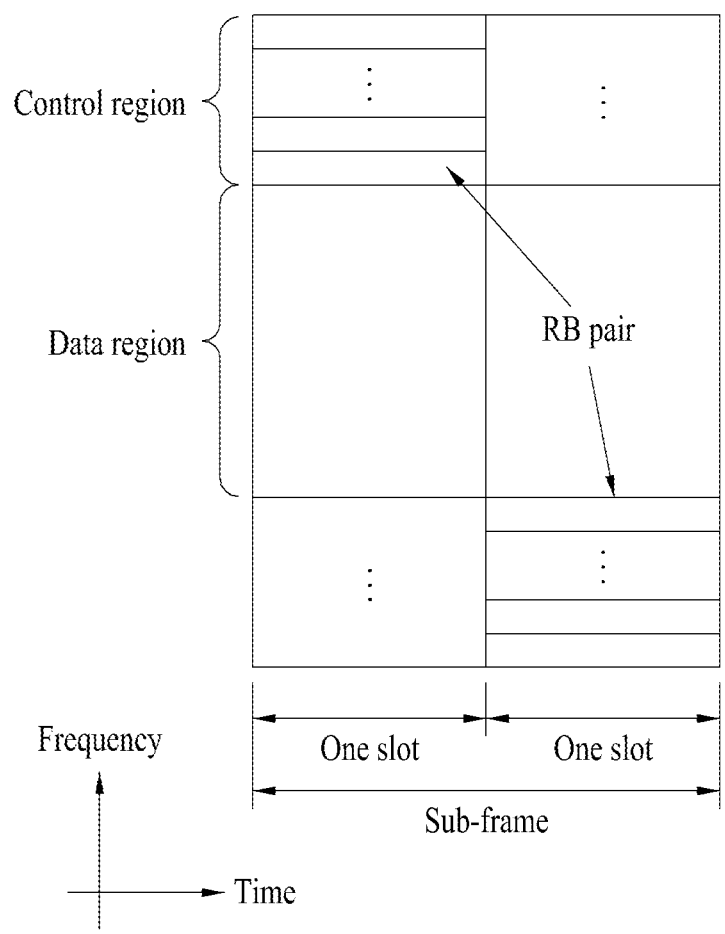
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:
  i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:
i) Cell-specific Reference Signal (CRS) shared among all UEs of a cell;
ii) UE-specific RS dedicated to a specific UE;
iii) DM-RS used for coherent demodulation of a PDSCH, when the PDSCH is transmitted;
iv) Channel State Information-Reference Signal (CSI-RS) carrying CSI, when downlink DM-RSs are transmitted;
v) Multimedia Broadcast Single Frequency Network (MBSFN) RS used for coherent demodulation of a signal transmitted in MBSFN mode; and
vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

CRSs serve two purposes, that is, channel information acquisition and data demodulation. A UE-specific RS is used only for data demodulation. CRSs are transmitted in every subframe in a broad band and CRSs for up to four antenna ports are transmitted according to the number of Tx antennas in an eNB.

For example, if the eNB has two Tx antennas, CRSs for antenna ports 0 and 1 are transmitted. In the case of four Tx antennas, CRSs for antenna ports 0 to 3 are respectively transmitted.

FIG. 5 illustrates patterns in which CRSs and DRSs are mapped to a downlink RB pair, as defined in a legacy 3GPP LTE system (e.g. conforming to Release-8). An RS mapping unit, i.e. a downlink KB pair may include one subframe in time by 12 subcarriers in frequency. That is, an RB pair includes 14 OFDM symbols in time in the case of the normal CP (see FIG. 5(*a*)) and 12 OFDM symbols in time in the case of the extended CP (see FIG. 5(*b*)).

In FIG. 5, the positions of RSs in an RB pair for a system where an eNB supports four Tx antennas are illustrated. Reference numerals 0, 1, 2 and 3 denote the REs of CRSs for first to fourth antenna ports, antenna port 0 to antenna port 3, respectively, and reference character 'D' denotes the positions of DRSs.

Channel State Information (CSI) Feedback

MIMO can be categorized into an open-loop scheme and a closed-loop scheme. The open-loop scheme performs MIMO transmission at a transmitter without feedback of CSI from a MIMO receiver, whereas the closed-loop scheme performs MIMO transmission at the transmitter using feedback of CSI from the MIMO receiver. In closed-loop MIMO, each of the transmitter and the receiver may perform beamforming based on CSI to obtain multiplexing gain of MIMO transmit antennas. The transmitter (e.g., eNB) may allocate an uplink control channel or an uplink shared channel to the receiver (e.g., UE) such that the receiver may feed back CSI.

CSI fed back may include a Rank Indicator (RI), a Precoding Matrix Index (PMI), and a Channel Quality Indictor (CQI).

The RI indicates information about a channel rank. The channel rank represents a maximum number of layers (or streams) through which different pieces of information may be transmitted through the same time-frequency resource. The RI is mainly determined by long term fading of a channel and, thus, the RI may be fed back at a longer period relative to the PMI and CQI.

The PMI is information about a precoding matrix used for transmission from the transmitter and is a value in which spatial characteristics of a channel are reflected. Precoding refers to mapping a transport layer to a transmit antenna. A layer-to-antenna mapping relation may be determined by a precoding matrix. The PMI indicates a precoding matrix index of an eNB preferred by a UE based on a metric such as Signal-to-Interference plus Noise Ratio (SINR). To reduce feedback overhead of precoding information, the transmitter and receiver may share a codebook including various precoding matrices and only an index indicating a specific precoding matrix in the codebook may be fed back.

In a system supporting an extended antenna configuration (e.g., LTE-A system), acquisition of additional multi-user diversity using Multi-User MIMO (MU-MIMO) is considered. When an eNB performs downlink transmission using CSI fed back by one of multiple UEs, it is necessary to prevent downlink transmission from interfering with other UEs since an interference channel is present between UEs multiplexed in the antenna domain in MU-MIMO. Accordingly, in order to correctly perform MU-MIMO operation, more accurate CSI feedback than Single User MIMO (SU-MIMO) needs to be fed back.

A new CSI feedback scheme that improves CSI composed of the RI, PMI, and CQI may be applied in order to measure and report more accurate CSI. For example, precoding information fed back by the receiver may be indicated by a combination of two PMIs. One (first PMI) of the two PMIs has long term and/or wideband attributes and may be referred to as W1. The other PMI (second PMI) of the two PMIs has short term and/or subband attributes and may be referred to as W2. A final PMI may be determined by a combination (or function) of W1 and W2. For example, if the final PMI is W, W may be defined as W=W1\*W2 or W=W2\*W1.

The CQI is information indicating channel quality or channel strength. The CQI may be represented by an index corresponding to a combination of predetermined MCSs. That is, a feedback CQI index may indicate a modulation scheme and a code rate. Generally, the CQI is a value reflecting a reception SINR capable of being obtained when the eNB configures a spatial channel using the PMI.

The CSI feedback scheme is divided into periodic reporting through a PUCCH, which is an uplink control channel, and aperiodic reporting through a PUSCH, which is an uplink data channel, performed at the request of an eNB.

CSI Reference Resource

In the current LTE/LTE-A, CSI reference resource related to channel measurement for the above-mentioned CSI feedback/report is defined. The CSI reference resource is defined as a group of physical RBs corresponding to a frequency band associated with the calculated CQI in frequency domain. In addition, the CSI reference resource is defined as $n-n_{CQI\_ref}$ in time domain. Here, the n indicates a subframe for CSI transmission/report and the $n-n_{CQI\_ref}$ corresponds to i) in the case of periodic CSI reporting, a smallest value corresponding to a valid subframe among values equal to or greater than 4, ii) in the case of non-periodic CSI reporting, a valid subframe corresponding to the subframe in which a CSI request in a uplink DCI format is transmitted, or iii) 4 in case of a CSI request of a random access response grant in the non-periodic CSI reporting. In this case, a valid subframe means the subframe that meets one of the following conditions. Firstly, it should be a downlink subframe for a corresponding user equipment. Secondly, it should not be an MBSFN subframe except in the case of transmission mode 9. Thirdly, in case of TDD, DwPTS should have a length equal to or greater than a prescribed length. Fourthly, it should not be included in a measurement gap configured for a corresponding user equipment. Lastly, in the case of the periodic CSI reporting, if a user equipment is configured with a CSI subframe set, it should correspond to one of elements in the CSI subframe set. The CSI subframe sets ($C_{CSI,0}$, $C_{CSI,1}$) are configured for the corresponding user equipment by a high layer. In the current standards, it is defined that the CSI reference resource are included in one of the two CSI subframe sets ($C_{CSI,0}$, $C_{CSI,1}$) but cannot be included in both of the two sets.

Measurement/Measurement Report

A measurement report is used for one or more of various techniques (handover, random access, cell search, etc.) designed to ensure mobility of UEs. Since the measurement report needs a certain degree of coherent demodulation, UE may perform measurement after acquiring synchronization and physical layer parameters, except for measurement of a received signal strength. The measurement report covers radio resource management (RRM) measurement such as reference signal receive power (RSRP), received signal strength indicator (RSSI) and reference signal received quality (RSRQ) measurement, which are measurements of signal strengths or signal strengths to total reception power of a serving cell and neighbor cells, and radio link monitoring (RLM) measurement, which measures a quality of a link with a serving cell to determine whether radio link failure has occurred.

Regarding the RRM, RSRP is a linear average of power distribution of RE for CRS transmission in downlink. RSSI is a linear average of receive power received by a user equipment. An OFDM symbol including RS for antenna port 0 is measured for RSSI. RSSI is a measured value including interferences from neighbor cells and noise power. If a specific subframe is indicated for RSRQ measurement through a higher layer signaling, RSSI is measured for all the OFDM symbols included in the specific subframe. RSRQ is a values measured in the format of N*RSRP/RSSI, where N is the number of RBs in a corresponding bandwidth at the time of RSSI measurement.

The purpose of RLM is to enable UE to monitor a downlink quality of its serving cell and to determine 'in-sync' or 'out-of-sync' for the corresponding cell. In this case, RLM is performed based on CRS. The downlink quality estimated by UE is compared with 'in-synch threshold (Qin)' and 'out-of-sync threshold (Qout)'. These thresholds are represented as PDCCH block error rate (BLER) of a serving cell. In particular, Qout and Qin are set to values corresponding to 10% BLER and 2% BLER, respectively. In reality, Qin and Qout have values corresponding to SINR of received CRS. If SINR of received CRS is equal to or higher than a certain level (Qin), UE determines to remain attached to a corresponding cell. If SINR of received CRS is equal to or lower than a certain level (Qout), UE declares radio link failure (RLF).

As can be seen from the above-mentioned RSRP definition, it is basically assumed that measurement reporting is performed using CRS. However, in case that cells share the same PCID, the cells having the same PCID cannot be distinguished from each other based on the CRS. Accordingly, RRM cannot be performed for each of the cells using the measurement report including RSRP/RSRQ based on the CRS only. Therefore, if the cells share the same PCID, RSRP/RSRQ measurement reporting may be additionally performed based on CSI-RSs which are individually transmitted. To increase reception accuracy in receiving CSI-RS of a specific cell, neighbor cells do not perform signal transmission in RE in which the CSI-RS is transmitted. Thus, measurement may be more accurately performed even though a frequency of CSI-RS transmission is lower than in the case of CRS. Therefore, by performing CRS-based RSRP/RSRQ measurement reporting and CSI-RS RSRP/RSRQ measurement reporting together regardless of whether or not the cells have different PCIDs, accuracy of RRM for a network may be enhanced.

Another purpose of CSI-RS transmission in each cell is for UE to perform CSI feedback in order to assist scheduling of a base station that determines a rank, a precoding matrix, and a modulation and coding scheme (MCS) (or CQI), which may be used in DL data transmission between a cell and the UE. According to a CoMP transmission scheme, a user equipment should feedback CSI even for downlink with a cooperative cell other than a serving cell. If CSI for all the cells contained in a CoMP cluster to which the serving cell of the UE belongs are fed back, an excessive amount of overhead occurs. Therefore, the UE may be configured to feedback CSI only for some cells contained in the CoMP cluster, i.e., a CoMP measurement set that is worth coordinated scheduling and coordinated data transmission. To determine a CoMP measurement set for a specific user equipment, it may be configured by selecting cells having RSRP of a predetermined level or higher. To this end, the user equipment performs RSRP measurement reporting on the cells contained in the CoMP cluster to which the corresponding user belongs. Alternatively, the base station may designate configurations of the CSI-RSs, for which the UE needs to perform RSRP or RSRQ measurement, as a CoMP management set and inform the user equipment of the designated configurations. Then, the UE may perform RSRP or RSRQ measurement for the CSI-RSs transmitted from the cells belonging to the designated CoMP management set. If the result of measurement meets a specific condition, the UE may perform reporting.

Additionally, in order to enable ICIC between CoMP clusters, the UE performs RSRP measurement and reporting for the cells in a neighbor CoMP cluster such that the network and the UE identify a cell in the neighbor CoMP cluster that applies strong interference to the UE and a cell to which the UE applies strong UL interference.

Along with CRS based RSRP/RSRQ measurement reporting for mobility management such as handover of UE, CSI-RS based RSRP/RSRQ measurement reporting may be performed for configurations of the CoMP measurement set and ICIC. Therefore, accuracy and flexibility of RRM for the network may be enhanced.

Method of Performing Measurement in D2D

In the following, measurement in D2D proposed by the present invention is explained based on the aforementioned description. FIG. 6 shows various D2D network environments to which embodiments of the present invention are applicable. Specifically, as shown in FIG. 6 (a), all UEs belonging to a D2D pair may exist in network coverage and a resource used for a D2D operation can be allocated by a serving base station. And, as shown in FIG. 6 (b), a part of a D2D pair may exist within coverage and another part of the D2D pair may exist at the outside of the coverage. Or, as shown in FIG. 6 (c), all UEs belonging to a D2D pair may exist at the outside of coverage. Although FIG. 6 (c) shows that there exists a master UE, the master UE may not exist. In this case, a resource used for a D2D operation can be allocated by a dUE0 or a dUE1 (i.e., the dUE0 or the dUE1 may operate as a master UE). In the following description, in case of FIG. 6 (b) and FIG. 6 (c), a 'base station' can be replaced with a master UE or a D2D UE performing a function of the master UE. And, in the following description, 'measurement' may particularly indicate 'interference measurement'.

Figure 7:
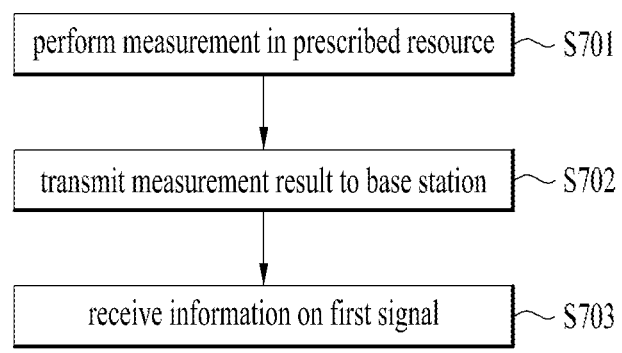
FIGS. 7 and 8 are diagrams for explaining embodiments of the present invention.

A method of performing measurement according to one embodiment of the present invention is described in the following. Referring to FIG. 7, a UE performs measurement in a prescribed resource area [S701] and may be then able to transmit a result of the measurement to a base station [S702]. Subsequently, the UE can receive information on a first signal from the base station [S703]. (The aforementioned measurement can also be performed in the middle of receiving the first signal.)

In this case, if the UE is configured to select a resource for transmitting the first signal, the information on the first signal includes a resource pool. In this case, the resource pool can be determined by the base station based on the result of the measurement. The first signal may correspond to one selected from the group consisting of a discovery signal, a communication signal, a synchronization signal and a scheduling assignment signal. If the first signal corresponds to a discovery signal, the aforementioned contents may relate to a resource allocation type 1 for transceiving the discovery signal. If the first signal corresponds to a communication signal, the aforementioned contents may relate to a mode 2. The UE determines a resource for transmitting the first signal from the resource pool included in the information on the first signal and may be then able to transmit the first signal. And, the measurement can be performed in a resource pool unit. In this case, the base station informs the UE of a plurality of resource pool candidates via upper layer signaling/SIB/control signaling (uplink grant, downlink assignment, etc.). The UE performs measurement on a plurality of the resource pool candidates and may be then able to report n (n is a positive integer) number of candidates from which a low energy is detected (i.e., low interference level) as a measurement result. (As a different method of determining a reported candidate, it may also consider a method of reporting a candidate including a measurement value equal to or less than a prescribed threshold value, a method of reporting M number of candidates in an ascending order of a measurement value, a method of reporting M number of random candidates among candidates of which a measurement value is equal to or less than a threshold value and the like. The aforementioned methods can be applied to overall of the present invention. For a reporting form, it may consider a bitmap scheme, an index reporting scheme and the like described in the following. And, such a value mentioned earlier in the foregoing description as the n and the M can be defined in advance or can be indicated by the base station (via upper level signaling, physical level signaling or the like).

Subsequently, if the base station is configured to allocate the resource for transmitting the first signal (if the first signal corresponds to a discovery signal, a type 2, if the first signal corresponds to a communication signal, a mode 1), the information on the first signal can include the resource for transmitting the first signal determined by the base station. In this case, the resource for transmitting the first signal, which is determined by the base station, can also be determined based on the measurement result. In this scheme, the measurement result, which is transmitted to the base station by the UE, may correspond to information on a resource area indicated by the base station in advance or a resource area to which the first signal is transmitted in a resource pool.

As a concrete example of performing measurement, a measurement granularity can be differently configured according to the aforementioned two schemes (the scheme that the resource for transmitting the first signal is selected by the UE and the scheme that the resource for transmitting the first signal is allocated by the base station). In particular, according to the scheme of directly allocating the resource for transmitting the first signal by the base station, since it is necessary to select a resource actually performing the transmission from a resource pool, it may require a more delicate measurement granularity. For example, if it is assumed that a resource pool is classified into a plurality of sub sets (sub bands), a first measurement granularity, which is used in the scheme of directly allocating the resource for transmitting the first signal by the base station, corresponds to a sub set and a second measurement granularity, which is used in the scheme of determining the resource for transmitting the first signal by the UE, corresponds to a resource pool. (This can also be implemented in a manner of using a same measurement granularity and differently configuring a distance between measurement candidates. For example, it can be implemented in a manner of applying a same measurement granularity to the two types of resource allocation, designating a single measurement candidate to each resource pool and designating a plurality of measurement candidates to a same resource pool.)

Meanwhile, if the first signal corresponds to a synchronization signal, the base station can report the number of synchronization signals detected according to a correlation result for a candidate sequence or a resource pool from which the least number of synchronization signal is reported as a measurement result. Or, a measurement report can be performed based on a result of detecting energy detected from an area to which a synchronization signal is transmitted. For example, when a synchronization signal resource pool 1 and 2 correspond to a #(40M+1) subframe and a #(40M+20) subframe, respectively, in time axis and correspond to center 6 RBs in frequency axis, having received measurement report indication, the UE can report an index of a resource pool of which interference is low or collision probability is low according to correlation for each resource pool or an energy detection result. This scheme may be non-limited by a case that the first signal corresponds to a synchronization signal. This scheme can also be applied to the aforementioned signals capable of being configured as the first signal.

Details of Measurement Target Resource—when RPT (Resource Pattern for Transmission) is Applied In the aforementioned method of performing measurement according to embodiment of the present invention, a prescribed resource area corresponding to a measurement target can include a plurality of RPTs (resource pattern for transmission).

Figure 8:
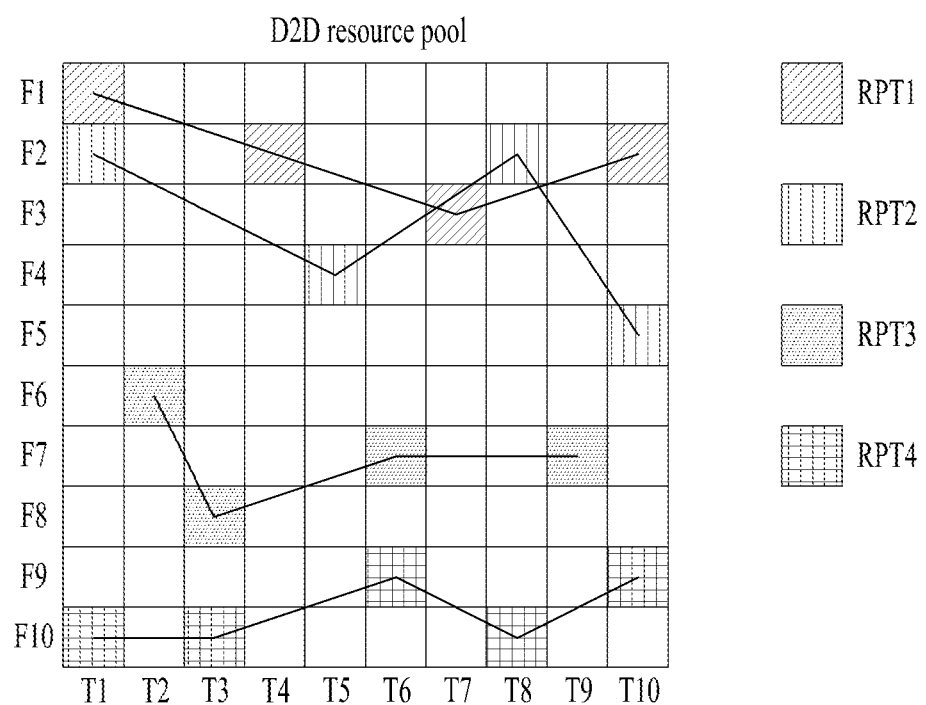

FIG. 8 shows an example of a D2D resource pool when RPT is applied. In FIG. 8, it is assumed that one resource pool consists of 10 units (T1 to T10) in time axis and 10 units (F1 to F10) in frequency axis. And, in FIG. 8, a time axis unit and/or a frequency axis unit is a logical expression. Units adjacent to each other in FIG. 8 are not always adjacent to each other on a physical resource. A time/frequency unit (e.g., frequency unit=2 PRB pairs, time unit=1 SF) related to RPT can be defined in advance or can be indicated via upper layer signaling. A UE can perform measurement on resources (all RPT resource units or a representative unit) corresponding to RPT (in a resource pool) based on information related to RPT defined in advance or indicated by a base station. And, the UE can report i) RPT of which a measurement value is equal to or less than a prescribed value, ii) n (n is a positive integer) number of RPT of which a measurement value is a smallest value, iii) an average value of measurement results to the base station as a measurement result.

As a concrete example of measurement result reporting, a measurement result measured by one of the aforementioned i), ii) and iii) method can be reported by an RPT index or a bitmap. For instance, in case that an index reporting scheme is used, it is necessary to report RPT of which strength (or interference strength) of a measured signal is equal to or less than a prescribed threshold value, and a measurement value for measurement RPT 0, 3, 5 and 9 (assume that there exist total 10 RPTs) is equal to or less than a predetermined threshold value, indexes for the RPT 0, 3, 5 and 9 should be reported. Hence, a preferred RPT can be reported using 16 bits such as {0000 0011 0101 1001}. In case of using a bitmap scheme, since 10 RPTs are defined, total 10 bits are required. In this case, a preferred RPT can be reported using 10 bits such as {1001010001}.

Meanwhile, although RPT is defined using the aforementioned scheme, a D2D UE can report m (m is a positive integer) number of frequency units of which strength of a received signal is smallest according to a time unit/resource pool irrespective of the RPT. (For example, the UE can report best M number of frequency units according to each time unit or report N (N is a positive integer) number of time/frequency units in a resource pool. In this case, the UE can report 0 to L number of frequency units satisfying a predetermined condition according to each time unit. The base station can select/assign RPT appropriate for the D2D UE based on the report of the UE.

Or, the UE can report average reception power (or total reception power) according to a time unit or a time unit (all time units or a predetermined number of time units) of which average reception power is equal to or less than a prescribed value. Having received a report, a base station can assign RPT (or D2D resource) consisting of time units reported by the UE (or RPT including a plurality of time units reported by the UE) to the UE.

If slot hopping and the like are introduced for diversity gain and the like, a measurement on each time unit can be applied in a manner of being restricted to a single slot (e.g., first slot) and what is mentioned in the above can be applied to a measurement method and a reporting scheme. This can also be used as a method of excluding a last symbol of a D2D subframe in which a section overlapped with cellular uplink transmission may occur from measurement. (In particular, it may be able to define a symbol(s) incapable of performing a measurement in a subframe in advance. Or, it may be able to trigger a specific symbol not to be used for a measurement via a specific signal (e.g., GAP symbol configuration (for protecting WAN UL)).

And, in order to reduce complexity of measurement, it may be able to perform a measurement on scheduling assignment allocating a resource used for communication instead of the resource used for the communication. This scheme is efficient when the scheduling assignment and the resource indicated by the scheduling assignment are implicitly interlocked (e.g., when the scheduling assignment indicates start of RPT shown in FIG. 8). This is because it is able to know resource use of a communication pool via energy detected from the scheduling assignment. As a different method, it is able to select and report a resource of not in use or a resource of less use in a manner of performing decoding on scheduling assignment.

Details of Measurement Target Resource (2)

In terms of time domain, a prescribed resource area, which becomes a measurement target, may correspond to a specific subframe set. A base station can indicate a UE to perform measurement on a plurality of subframe sets. In this case, a plurality of the subframe sets may correspond to a subframe set for a cellular link and a subframe set for a D2D link. If a D2D operation is performed in every Xms, measurement can be performed on (each of) X number of subframe sets. If measurement is performed on at least a part of a plurality of the subframe sets, a measurement result reported to the base station can include a measurement result measured on 1 (1 is a positive integer) number of subframe sets of which a measurement result (e.g., interference level) is smallest. As a different example, the base station can indicate the UE to measure a resource set according to usage (scheduling assignment, discovery, communication and the like), which is indicated to the UE using SIB or control signaling in advance. It is able to define a D2D SS pool corresponding to a resource area for transceiving a D2D synchronization signal, a D2D SA pool for transceiving D2D scheduling assignment, a D2D data pool for transmitting D2D data and the like. The base station can indicate each UE to measure and report reception power (or interference) for a specific pool.

In terms of frequency domain, a prescribed resource area, which becomes a measurement target, may correspond to a sub set of a frequency resource defined for a D2D operation. For example, if total system bandwidth corresponds to 10 MHz (50 RBs), the total system bandwidth can be configured by X number of subsets (each subset may correspond to a set of contiguous RBs or a set of RBs configured according to a specific rule (e.g., Xn+1, Xn+2, . . . Xn+(X−1)) and a UE can report a measurement result measured on each subset. In this case, the UE designates a plurality of subsets for a subframe set corresponding to all subsets or a specific subset (e.g., 8n (n=0, 1, 2, . . . ) of which interference is smallest among measurement results) in frequency domain and indicates to report a measurement result measured on each subset. Or, the UE can indicate to report a measurement result measure on a resource set of which interference is low among measurement results. If resources capable of being used as D2D usage are defined as a D2D resource pool, a resource pattern available in the resource pool can be configured. In this case, it is able to indicate the UE to measure one or more resource patterns. If a hopping pattern is applied, the UE can perform interference measurement on each pattern and the UE can report a measurement result measured on all patterns or a measurement result measured on the specific number of patterns of which an interference level is low.

And, a prescribed resource area, which becomes a measurement target, may correspond to a known signal (RS, CSI-RS configuration, zero-power CSI-RS configuration, etc.). For example, a base station can signal a CSI-RS configuration for D2D measurement to a UE according to determination of the base station or a request of the UE. The prescribed resource area using the known signal can use a resource included in the resource in terms of the time domain, the resource in terms of the frequency domain, the resource in terms of time-frequency domain only for an actual measurement. For example, if the proposed frequency domain subset is signaled together with a D2D IMR configuration, the UE can perform a measurement at an IMR position in a PRB pair corresponding to the frequency domain subset. In case of performing a measurement on a plurality of frequency subsets, a D2D IMR can be configured according to each subset or a measurement can be performed according to each subset for a single D2D IMR configuration.

As mentioned in the foregoing description, a report on a measurement result in the aforementioned measurement resource can include a report on a predetermined number of resource sets randomly selected from resource sets of reception power equal to or less than a prescribed level as well as a report on all measurement results and a report on n (n is a positive integer) number of measurement results in an ascending order of a measurement value/interference. As a concrete reporting scheme, it may use an index or a bitmap. Details for the reporting scheme are identical to what is mentioned in the foregoing description.

The UE may be able to perform a CSI report using a result measured in the aforementioned prescribed resource area used for measurement. In particular, CSI can be reported based on interference measurement (or SINR) in a D2D operation.

As a different method, a signal measurement uses a signal measurement result measured in an area in which a D2D operation is currently performed and an interference measurement can be performed on all system bandwidths (or each sub band, the aforementioned resource unit). A signal measurement value for an area in which a signal measurement is not performed is replaced with a signal measurement value measured in an area in which a D2D operation is currently performed and may be then able to deduct SINR measurement and CSI from the signal Measurement value. In order to provide such information as a channel status of a D2D pair, distance between the D2D pair, and the like to a base station, a D2D reception UE measures power of a received D2D signal (e.g., RS) and may be able to report the power to the base station. (In the aspect of discovery, a UE configured to detect a discovery signal can report an ID of a transmission UE configured to transmit the discovery signal, which is successfully detected by the UE, strength of the received discovery signal and the like to the base station or a head UE.)

Meanwhile, in the forgoing description, a resource corresponding to a prescribed resource area should correspond to an available resource in which a signal related to D2D communication is transmittable. Specifically, among the whole resources of the prescribed resource area, an OFDM symbol for AGC (automatic gain control) and/or an OFDM symbol corresponding to a gap for a timing difference with uplink transmission may not be included in the available resource. The available resource can be restricted to all resources in which a D2D signal is transmittable, a first slot of a D2D subframe, a D2D DMRS and the like. For the same reason, if the prescribed resource area and an SRS signal transmission area of a UE are overlapped with each other, the UE can omit SRS signal transmission.

Device Configuration According to Embodiment of the Present Invention

Figure 9:
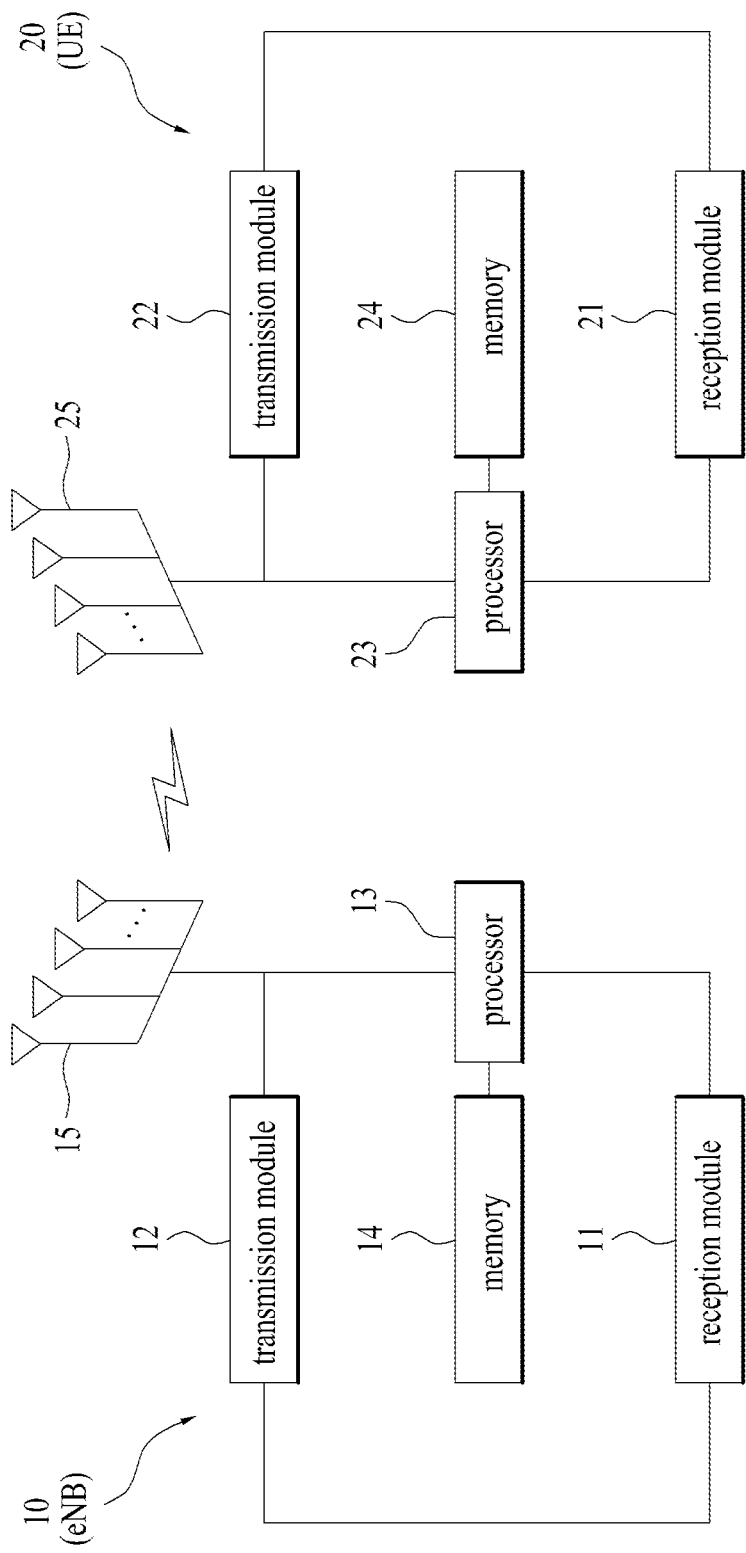
FIG. 9 is a diagram for a configuration of a transceiver.

FIG. 9 is a diagram for a configuration of a transmission point device and a user equipment device according to embodiment of the present invention.

Referring to FIG. 9, a transmission point device 10 according to the present invention can include a reception module 11, a transmission module 12, a processor 13, a memory 14 and a plurality of antennas 15. A plurality of the antennas 15 correspond to a transmission point device supporting MIMO transmission and reception. The reception module 11 can receive various signals in UL, data and information from a UE. The transmission module 12 can transmit various signals in DL, data and information to the UE. The processor 13 can control overall operation of the transmission point device 10.

The processor 13 of the transmission point device 10 according to one embodiment of the present invention can process items required by each of the embodiments mentioned in the foregoing description.

Besides, the processor 13 of the transmission point device 10 performs a function of processing information received by the transmission point device 10, information to be transmitted to external and the like. The memory 14 can store the processed information and the like for prescribed time and the memory can be replaced with such a configuration element as a buffer (not depicted) or the like.

Referring to FIG. 9, a user equipment device 20 according to the present invention can include a reception module 21, a transmission module 22, a processor 23, a memory 24 and a plurality of antennas 25. A plurality of the antennas 25 correspond to a user equipment device supporting MIMO transmission and reception. The reception module 21 can receive various signals in DL, data and information from a base station. The transmission module 22 can transmit various signals in UL, data and information to the base station. The processor 23 can control overall operation of the user equipment device 20.

The processor 23 of the user equipment device 20 according to one embodiment of the present invention can process items required by each of the embodiments mentioned in the foregoing description.

Besides, the processor 23 of the user equipment device 20 performs a function of processing information received by the user equipment device 20, information to be transmitted to external and the like. The memory 24 can store the processed information and the like for prescribed time and the memory can be replaced with such a configuration element as a buffer (not depicted) or the like.

A specific configuration of the transmission point device and the user equipment device can be implemented in a manner of independently applying the items mentioned earlier in various embodiments of the present invention or in a manner of applying two or more embodiments at the same time. For clarity, explanation on overlapped contents is omitted at this time.

And, in explaining FIG. 9, explanation on the transmission point device 10 can be identically applied to a relay device as a main entity of DL transmission or a main entity of UL reception. Explanation on the user equipment device 30 can also be identically applied to a relay device as a main entity of DE reception or a main entity of UL transmission.

The embodiments of the present invention mentioned in the foregoing description can be implemented using various means. For instance, the embodiments of the present invention can be implemented using hardware, firmware, software and/or any combinations thereof.

In case of the implementation by hardware, a method according to each of the embodiments of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each of the embodiments of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. For instance, the respective configurations disclosed in the aforementioned embodiments of the present invention can be used by those skilled in the art in a manner of being combined with each other. Therefore, the present invention is non-limited by the embodiments disclosed herein but intends to give a broadest scope that matches the principles and new features disclosed herein.

It will be apparent to those skilled in the art that the present invention may be embodied in other specific forms without departing from the spirit and essential characteristics of the invention. Thus, the above embodiments should be considered in all respects as exemplary and not restrictive. The scope of the present invention should be determined by reasonable interpretation of the appended claims and the present invention covers the modifications and variations of this invention that come within the scope of the appended claims and their equivalents. The present invention is non-limited by the embodiments disclosed herein but intends to give a broadest scope that matches the principles and new features disclosed herein. And, it is apparently understandable that an embodiment is configured by combining claims failing to have relation of explicit citation in the appended claims together or can be included as new claims by amendment after filing an application.

INDUSTRIAL APPLICABILITY

The aforementioned embodiments of the present invention can be applied to various mobile communication systems.

What is claimed is:

1. A method of performing a measurement by a user equipment in a wireless communication system, the method comprising:
   determining a measurement granularity according to whether the user equipment is configured to select a resource for transmitting a signal;
   performing the measurement in a prescribed resource area based on the measurement granularity;
   transmitting a result of the measurement to a base station;
   receiving, from the base station, information on the signal determined based on the result of the measurement; and
   transmitting the signal through a resource determined based on the received information on the signal.

2. The method of claim 1, wherein when the user equipment is not configured to select the resource for transmitting the signal, the information on the signal comprises the resource allocated by the base station, and
   wherein the resource for transmitting the signal is determined based on the result of the measurement.

3. The method of claim 1, wherein when the user equipment is configured to select the resource for transmitting the signal, the information on the signal comprises the resource pool determined based on the result of the measurement by the base station, and the user equipment selects the resource in the resource pool.

4. The method of claim 1, wherein when the user equipment is not configured to select the resource for transmitting the signal, the measurement granularity corresponds to a subset, and
   wherein when the user equipment is configured to select the resource for transmitting the signal, the measurement granularity corresponds to a resource pool comprising a plurality of subsets.

5. The method of claim 1, wherein the prescribed resource area comprises a plurality of resource patterns for transmission (RPTs).

6. The method of claim 5, wherein the result of the measurement corresponds to information indicating n number of RPTs of which a measurement value is smallest among measurement results measured on each of a plurality of the RPTs, where n is a positive integer.

7. The method of claim 6, wherein the information indicating the n number of RPTs of which the measurement value is smallest corresponds to n number of RPT indexes.

8. The method of claim 6, wherein the information indicating the n number of RPTs of which the measurement value is smallest corresponds to a bitmap of a size of total numbers of RPTs.

9. The method of claim 1, wherein a resource corresponding to the prescribed resource area corresponds to an available resource in which a signal related to device-to-device communication is transmittable.

10. The method of claim 9, wherein an Orthogonal Frequency Division Multiplexing (OFDM) symbol related to automatic gain control (AGC) is excluded from the available resource.

11. The method of claim 1, wherein the signal corresponds to one of a discovery signal, a communication signal, a synchronization signal and a scheduling assignment signal.

12. A user equipment device for performing a measurement in a wireless communication system, the user equipment comprising:
   a reception module;
   a transmission module; and
   a processor connected with the reception module and the transmission module,
   wherein the processor:
      determines a measurement granularity according to whether the user equipment is configured to select a resource for transmitting a signal,
      performs the measurement in a prescribed resource area based on the measurement granularity,
      controls the transmission module to transmit a result of the measurement to a base station,
      controls the reception module to receive, from the base station, information on the signal determined based on the result of the measurement, and
      controls the transmission module to transmit the signal through a resource determined based on the received information on the signal.

* * * * *